(12) United States Patent
Arvanites (10) Patent No.: US 7,921,807 B2
(45) Date of Patent: Apr. 12, 2011

(54) FLUID-FILLED DURABLE PET BED

(76) Inventor: Margherita Arvanites, Fountain Hills, AZ (US)

( * ) Notice: Subject to any disclaimer, the term of this patent is extended or adjusted under 35 U.S.C. 154(b) by 0 days.

(21) Appl. No.: 12/587,483

(22) Filed: Oct. 6, 2009

(65) Prior Publication Data

US 2010/0077962 A1 Apr. 1, 2010

Related U.S. Application Data

(63) Continuation of application No. 11/756,910, filed on Jun. 1, 2007, now Pat. No. 7,669,552.

(51) Int. Cl.
*A01K 1/015* (2006.01)
*A01K 1/035* (2006.01)

(52) U.S. Cl. ........................... 119/28.5; 5/655.5

(58) Field of Classification Search .............. 119/28.5, 119/526; 5/644, 655.3, 655.5, 420, 706
See application file for complete search history.

(56) References Cited

U.S. PATENT DOCUMENTS

| 5,068,921 | A | * | 12/1991 | Jones | 2/2.5 |
| 5,191,665 | A | * | 3/1993 | Breedlove | 5/656 |
| 5,226,384 | A | * | 7/1993 | Jordan | 119/28.5 |
| 5,669,092 | A | * | 9/1997 | Lin | 5/706 |
| 6,260,222 | B1 | * | 7/2001 | Lin | 5/709 |
| 6,374,771 | B1 | * | 4/2002 | Zwickle | 119/28.5 |
| 6,997,218 | B1 | * | 2/2006 | Garcia et al. | 141/98 |
| 2004/0161989 | A1 | * | 8/2004 | Dennis et al. | 442/135 |
| 2006/0179577 | A1 | * | 8/2006 | Chaffee | 5/706 |
| 2008/0022935 | A1 | * | 1/2008 | Fine | 119/28.5 |

* cited by examiner

*Primary Examiner* — Yvonne R. Abbott
(74) *Attorney, Agent, or Firm* — Mathew R.P. Perrone, Jr.; Brie A. Crawford (57) ABSTRACT

An inflatable bed is filled with a fluid, whether it is a gas or a liquid, a desirable, in order to form a comfortable bed. The durable pet bed has at least two layers of bullet resistant fabric therein, with a fluid chamber therein protected on all sides by the bullet resistant fabric layers and capable of receiving a gas, fluid, gel, or liquid to provide comfort and safety for the pet using the bed.

15 Claims, 7 Drawing Sheets

FLUID-FILLED DURABLE PET BED

CROSS-REFERENCE TO RELATED APPLICATION

This application is a continuation of U.S. patent application Ser. No. 11/756,910, filed Jun. 1, 2007, now U.S. Pat. No. 7,669,552.

This invention relates to a durable pet bed and more particularly to a fluid-filled, durable pet bed, which endures chewing and other adverse conditions; and provides a durable, comfortable, fluid inflatable pet bed.

BACKGROUND OF THE INVENTION

When an inflatable bed is filled with a fluid, whether it is a gas or a liquid, a desirable, comfortable bed can be achieved, thanks in great part to the fluid. A fluid containing bed can easily adjust to the shape and weight of whoever uses the bed. As these beds are highly desirable for human use, they are also desirable for pet use.

Most pet beds, especially beds for dogs, are chewed or clawed by the pet and suffer other assaults on the integrity thereof. As the bed is chewed or clawed, it suffers wear and tear. The wear and tear can lead to a quick and frequent replacement of the bed. It also may cause injury to the pet as the bed loses its function. A bed is especially hazardous if pieces break off or are otherwise separated therefrom, and are ingested by the pet.

It is also quite simple for the claws or the teeth of a pet to puncture a fluid filled bed. These factors also mitigate against the use of a fluid filled bed for a pet. Such a puncture permits escape of the fluid and ruins the bed.

Yet such beds are a desirable attraction for pets. Not only does the bed provide comfort for the pet; it also provides better sleeping conditions. Such a bed provides both comfort and health factors. Yet, it is very difficult to provide a durable bed and safe bed of the fluid filled type for a pet, such as a cat or a dog.

Especially problematic for a dog, a cat or another pet is recovery from surgery. A comfortable place to sleep is important for such recovery. Yet, surgery makes it hard for a pet to get comfortable for sleeping. A properly designed bed can help such a recovery.

If a fluid-filled pet bed can be developed, which is durable while maintaining safety, and still providing comfort, great advantages can be obtained. However, such a pet bed is conspicuously unavailable and even taught not to be practical.

SUMMARY OF THE INVENTION

Among the many objectives of this invention is the provision of a durable, fluid-filled pet bed, which provides comfort and safety for a pet.

A further objective of this invention is the provision of a durable, fluid-filled pet bed, utilizing a bullet resistant fabric.

Yet a further objective of this invention is the provision of a durable, fluid-filled pet bed having a cover.

A still further objective of this invention is the provision of a durable pet bed having a cover thereover.

Another objective of this invention is the provision of a durable pet bed with a liquid filling therein.

Yet another objective of this invention is the provision of a durable pet bed with a gas filling therein.

Still, another objective of this invention is the provision of a durable pet bed with a fluid filling therein.

Moreover another objective of this invention is the provision of a durable pet bed with a gel filling therein.

Also, an objective of this invention is the provision of a durable pet bed with a plurality of layers therein.

A further objective of this invention is the provision of a durable pet bed, which is comfortable for post surgery patients with a plurality of layers therein.

These and other objectives of the invention (which other objectives become clear by consideration of the specification, claims and drawings as a whole) are met by providing a durable pet bed having at least two layers of bullet resistant fabric therein, with a fluid chamber therein protected on all sides by the bullet resistant fabric layers and capable of receiving a gas, fluid, gel, or liquid to provide comfort and safety for the pet using the bed.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

A durable pet bed has a fluid receiving section or fluid chamber protected by at least two layers of the same or different version of a bullet resistant material, and a decorative cover or padded cover. The decorative or padded cover both conceals the bullet resistant material, and provides a desirable and functional appearance.

This bed is especially beneficial for those pets recovering from surgery by removing the pressure points on wounds and removes the pressure points for animals with arthritis in addition to many other medical benefits. Because the bed does not contain the standard fibers and foam in traditional beds, these beds are less likely to attract pests, fleas or other problems commonly found in dog beds made today, which in turn minimizes and avoids disease and illness in animals caused thereby. Additionally for the same reason, the bed of this invention is less likely to hold the odors caused by pet dander or other undesirable items, which can trigger human allergic reactions.

The bullet resistant material is most preferably a woven fabric. With the bullet resistant material, the cover provides additional durability to the durable pet bed. The at least two layers of bullet resistant material contains the fluid receiving section or fluid chamber therein and substantially reduces any puncture or loss of fluid from the fluid receiving section or fluid chamber. It also renders the bed more durable. The decorative cover adds to a desired appearance for the bed.

Many suitable bullet resistant woven fabrics exist for the purposes of this invention. KEVLAR is a registered trademark of the E. I. Dupont Company of Wilmington, Del., which is a usable fabric for the bullet resistant woven fabric. Denier nylon is also both a usable fabric and the most preferred fabric for the bullet resistant woven fabric. Other bullet resistant woven fabrics may also be used.

Most preferably, denier nylon is the bullet resistant woven fabric used. Preferably, the denier nylon has a denier of 450 to 1800. More preferably, the denier nylon has a denier of 1500 to 1750. Most preferably, the denier nylon has a denier of 1650 to 1725.

In a preferred fashion, at least two layers of denier nylon fabric with a fleece cover secured around the outer surface contains a flexible material between the layers while providing an inner chamber. The fluid receiving chamber is formed from a rayon or durable material capable of containing a fluid and adds to the durability of the inner chamber.

Due to its flexibility and durability, the bullet resistant denier nylon fabric is the preferred fabric for use in this bed. More particularly, the denier nylon has a woven texture and is suitable for forming bullet resistant devices. As these fabrics of denier nylon are layered, a fleece cover is stitched glued or otherwise secured there around. Other bullet resistant flexible materials or fabric may also be used.

Any suitable cover fabric, whether woven or non woven may cover the bullet resistant fabric and the other contents of the durable pet bed. The preferred fabric is a fleece fabric, which is preferably cross stitched to be secured over the bullet resistant fabric. Any other securing method, including but not limited to sewing, gluing or sealing, is usable. This cross stitched fleece fabric gives the best product.

In order to minimize breakage or rupture of the fluid containing package or fluid chamber, the fluid may include sealing agents to react with the air and seal the open hole or other source of fluid leak. Furthermore, in a preferred form, the fluid containing package has a valve, through which a liquid may be inserted therein.

If it is desired to use a gas to fill the fluid containing package, a conversion valve may be used. A typical and suitable conversion valve is a gas valve of the type disclosed in U.S. Pat. No. 6,328,058 to Mathew R. P. Perrone, Jr., incorporated herein by reference can used to fill the bed with a gas. By applying the valve conversion to the liquid receiving valve, gas, such as compressed air, may be inserted therethrough, and form the fluid-filled bed.

The cover, the fluid chamber, or the bullet resistant fabric may be welded or hermetically sealed. Such structure adds strength to the durable pet bed.

Figure 1:
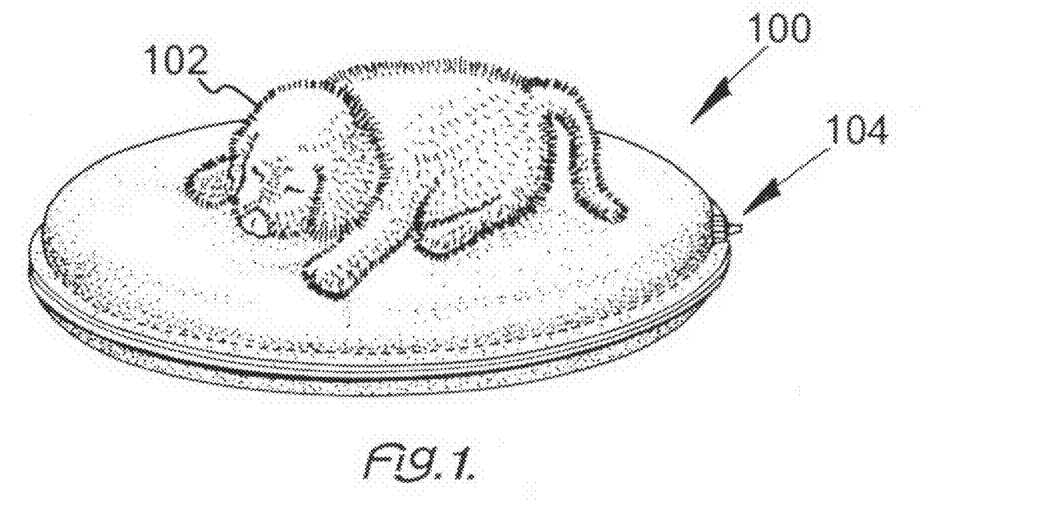
FIG. 1 depicts a top perspective view of the durable pet bed 100 of this invention.

In FIG. 1, durable pet bed 100 supports dog 102. Bed 100 has a filling 104 of fluid, such as water or air or a gel, which renders bed 100 extremely comfortable for dog 102 or other pet.

Figure 2:
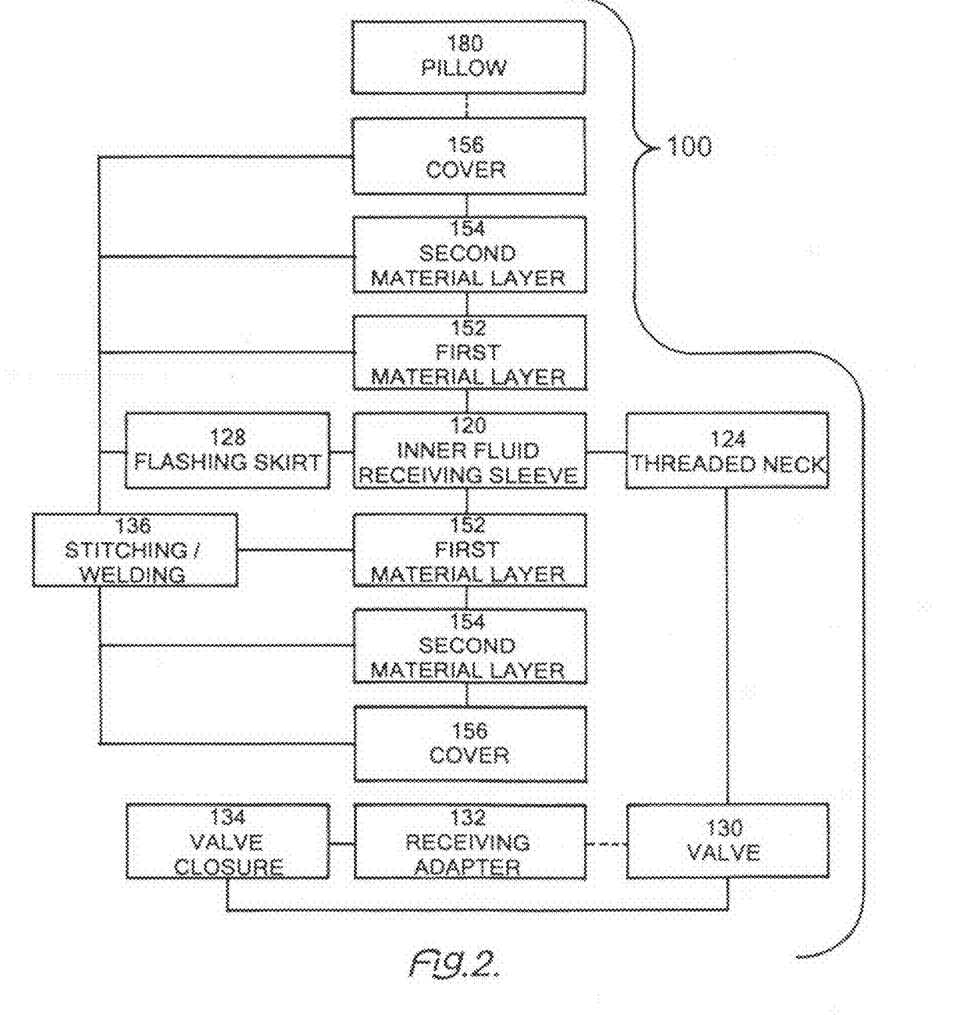
FIG. 2 depicts a block diagram in order to show a structure for the durable pet bed 100 of this invention.

Referring now to FIG. 2, block diagram for durable pet bed 100 has an inner fluid receiving sleeve 120 with a first material layer 152 covering and containing the fluid receiving chamber 120. A second material layer 154 covers and contains the first material layer 152, so that first material layer 152 is between the sleeve 120 and second material layer 154. Both the first material layer 152 and the second material layer 154 are formed of bullet resistant woven fabric or other bullet resistant material.

The fluid receiving chamber 120 may be made of any flexible fluid containable or holding material. In case of a puncture, the fluid receiving chamber 120 may be self sealing, react with the fluid contained therein to seal the puncture, or have combinations of such materials therein for the sealing purposes. Such a structure permits the bed 100 to resist claw or teeth puncture problems. Both the first material layer 152 and the second material layer 154 cooperate therewith to at least minimize puncture problems.

With the further consideration of FIG. 2, at least one decorative material layer 156 may be placed over the second material layer 154. Preferably, the at least one decorative material layer 156 also adds to the durability of the bed 100. Included in the cover or decorative material layer 156 may optionally be a pillow shape 180 (shown in FIG. 8). The entire assembly of durable bed 100 may be secured by stitching or welding 136. A strip of flashing skirt 128 may optionally be inserted at the edge of the layers to facilitate the stitching or welding.

The fluid receiving valve 130 for the fluid receiving chamber 120 extends through the first material layer 152, the second material layer 154, and the at least one decorative material layer 156. Fluid receiving valve 130 may receive fluids, such as air or water, or a gel. Preferably, fluid receiving valve 130 is a fluid valve with a threaded neck 124, capable of receiving adapter 132 in a threaded relation therewith. A valve closure 134 may close either fluid receiving valve 130 or adapter 132, as desired in order to further secure the fluid in the fluid receiving chamber 120.

Figure 3:
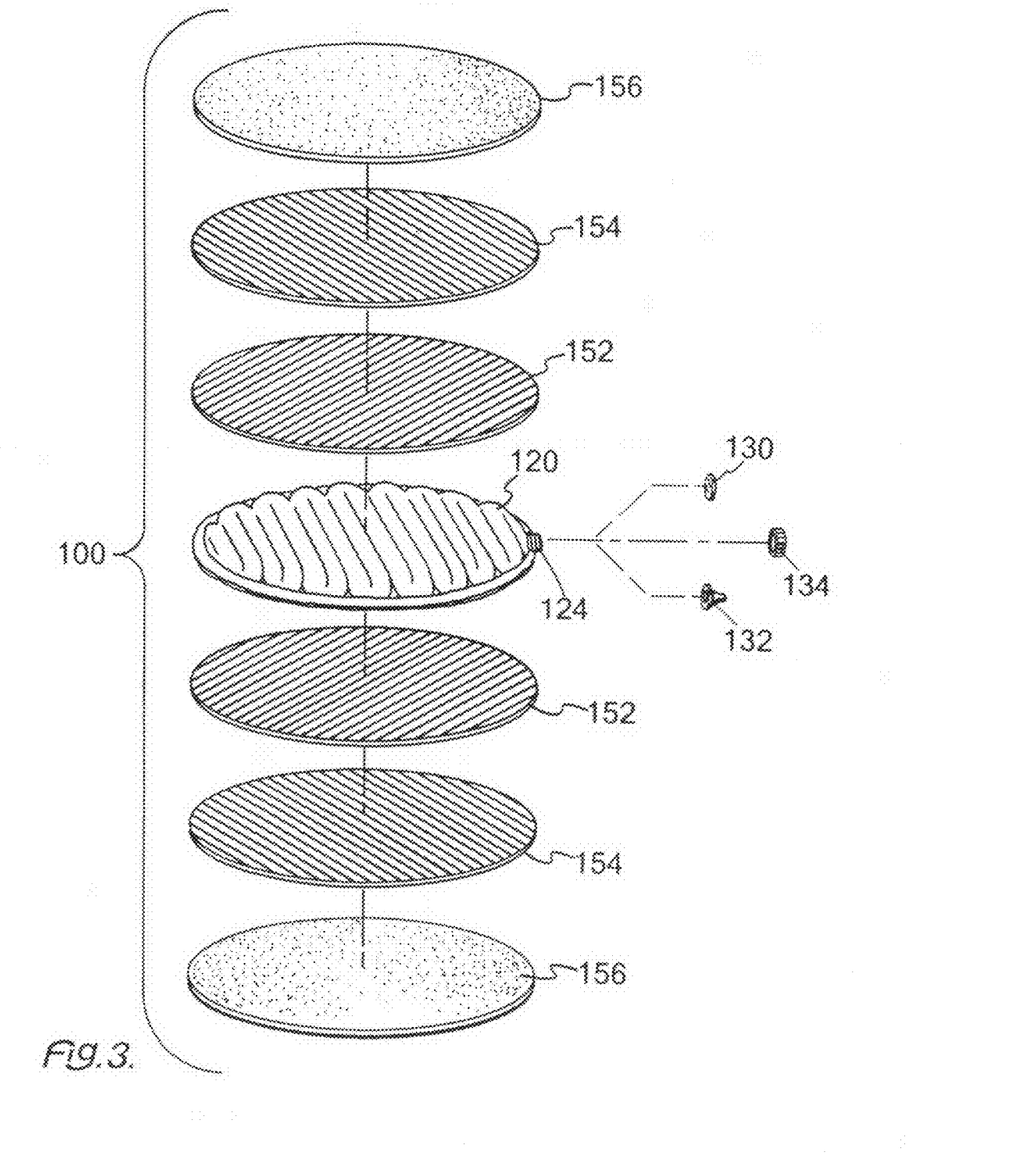
FIG. 3 depicts an exploded, perspective view of the durable pet bed 100 of this invention.
Figure 4:
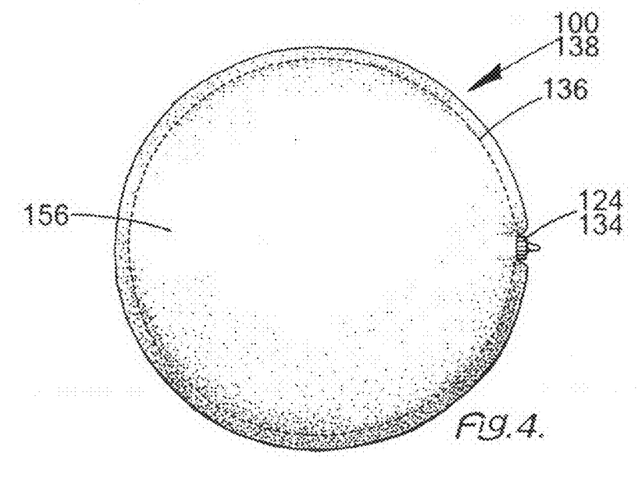
FIG. 4 depicts a top plan view for the durable pet bed 100 of this invention.
Figure 5:
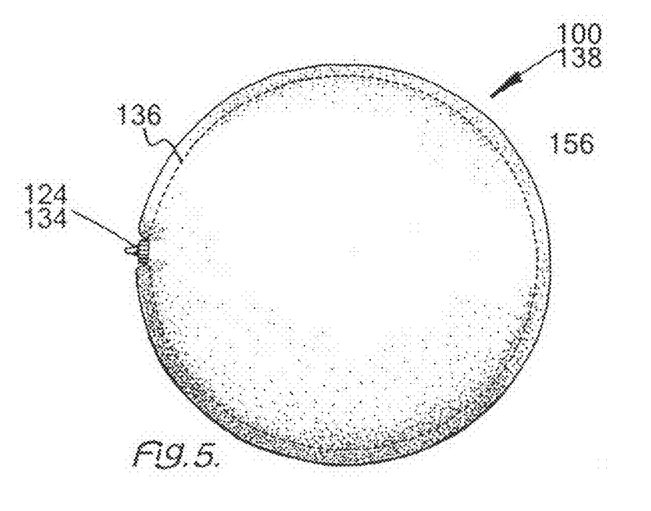
FIG. 5 depicts a bottom plan view for the durable pet bed 100 of this invention.

Adding FIG. 3, FIG. 4, and FIG. 5 to the consideration 120, the first material layer 152 cooperates with the second material layer 154 to provide the desired durability, especially when considered with the at least one cover or one decorative material layer 156. Fluid receiving valve 130 may receive fluids, such as air or water, or a gel Preferably, fluid receiving valve 130 is a fluid valve, capable of receiving adapter 132 in a threaded relation therewith. A typical adapter is disclosed in U.S. Pat. No. 6,328,058 to Mathew Perrone, incorporated herein by reference. Additionally, a valve closure 134 may close either fluid receiving valve 130 or adapter 132, as desired in order to further secure the fluid in the fluid receiving chamber 120. A top plan view of durable pet bed 100 provides a circular appearance 138, sewing or welding 136 within the perimeter of pet bed 100.

Figure 6:
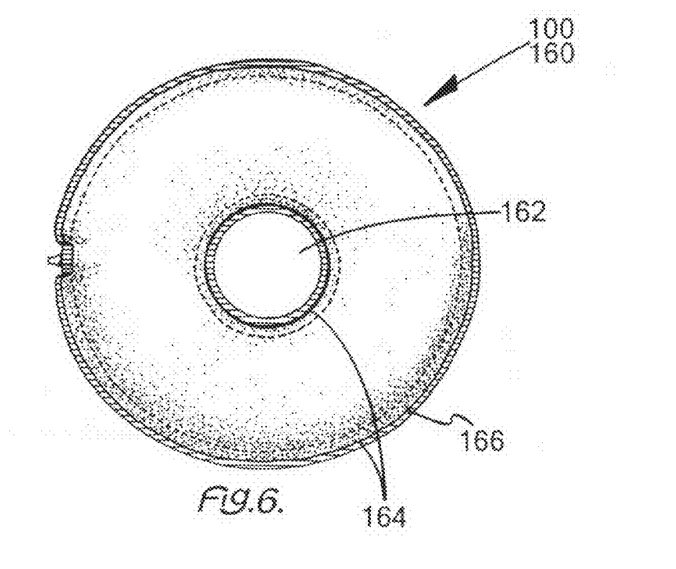
FIG. 6 depicts a top plan view for the durable pet bed 100 of this invention showing the doughnut shape 160.

Now considering FIG. 6, the durable pet bed 100 may have a doughnut shape 160. The inner fluid receiving chamber 120 is adapted to the appropriate shape therefore. Around the inner aperture 162 and the outer diameter 166 of the doughnut shape 160 is secured an additional piece of shaped material layer 164, preferably of the described bullet resistant material.

The diameter of the inner aperture 162 is preferably up to about 15 percent of the outer diameter 166 of the doughnut shape 160. More preferably, the diameter of the inner aperture 162 is preferably about one to about 12 percent of the outer diameter 166 of the doughnut shape 160. Most preferably, the diameter of the inner aperture 162 is preferably about three to about 10 percent of the outer diameter 166 of the doughnut shape 160.

Figure 10:
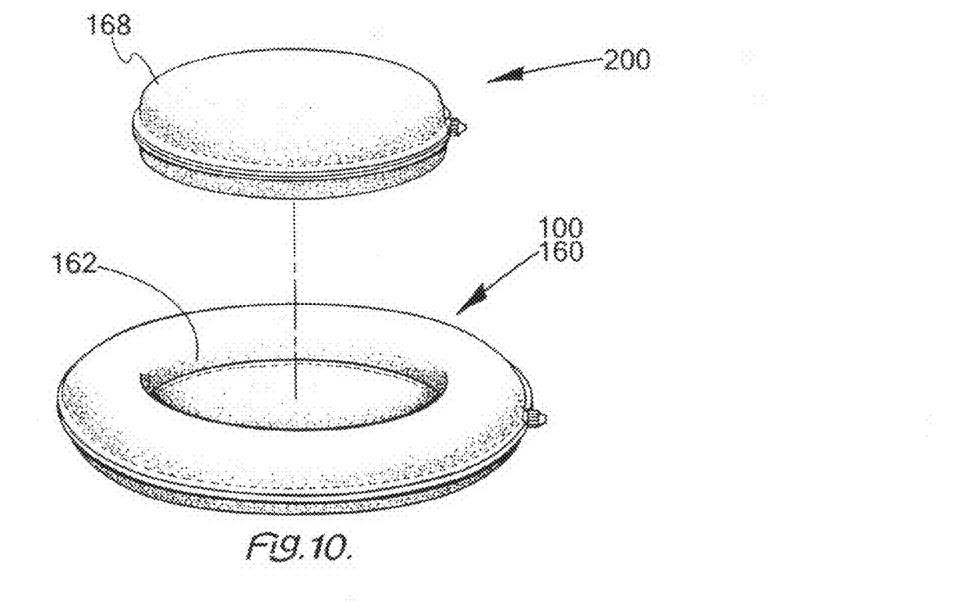
FIG. 10 depicts an exploded view for the durable pet bed 100 of this invention according to FIG. 6, showing a center pillow 200 for the doughnut shape 160.

Within the inner aperture 162, may optionally be placed a pillow 168 (shown in FIG. 10). Preferably pillow 168 is fluid filled and structured much like FIG. 3. Also, outer diameter 166 and inner aperture 162 may be protected with the above-described bullet resistant material sewn or other similar material.

Figure 7:
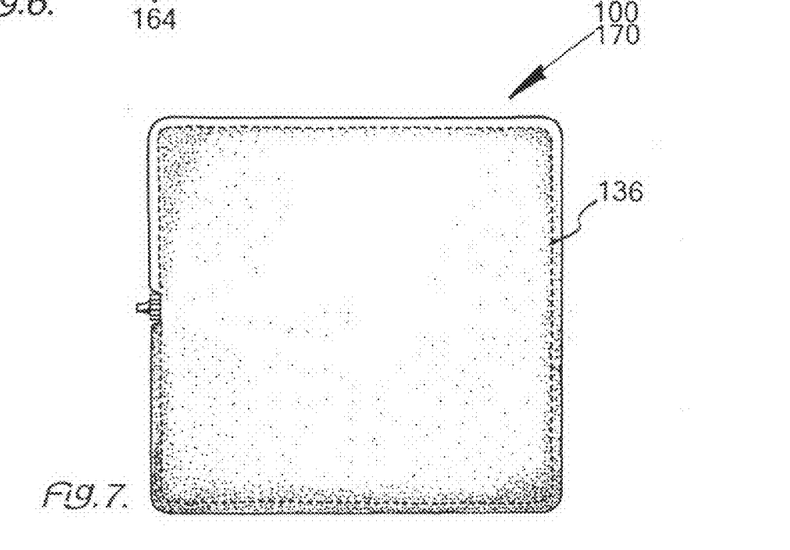
FIG. 7 depicts a top plan view for the durable pet bed 100 of this invention showing the rectangular shape 170.

Turning now to FIG. 7, durable pet bed 100 of this invention may have a rectangular shape 170 from the top view. Other parts are adjusted accordingly with stitching or welding 136 (FIG. 2) assembling bed 100 in rectangular shape 170.

Figure 8:
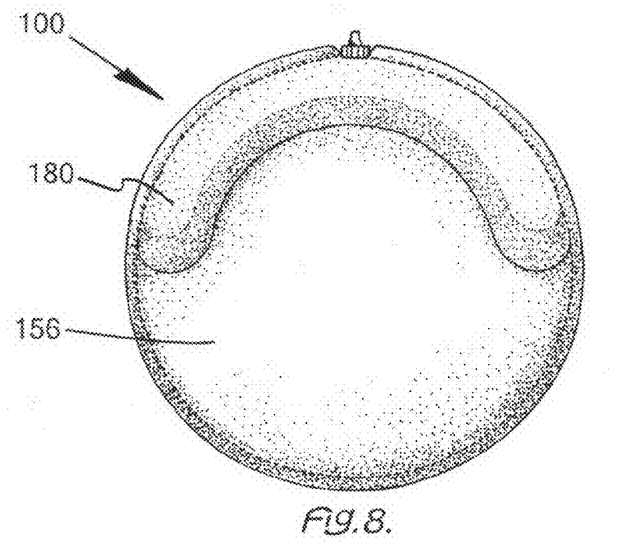
FIG. 8 depicts a top plan view for the durable pet bed 100 of this invention showing the pillow shape 180.

Turning now to FIG. 8, the durable pet bed 100 of this invention has a pillow shape 180 secured to cover 156. Such securing is accomplished by direct or pocket securing as desired. Pillow shape 180 may be for comfort, aesthetics or other desired purposes.

Figure 9:
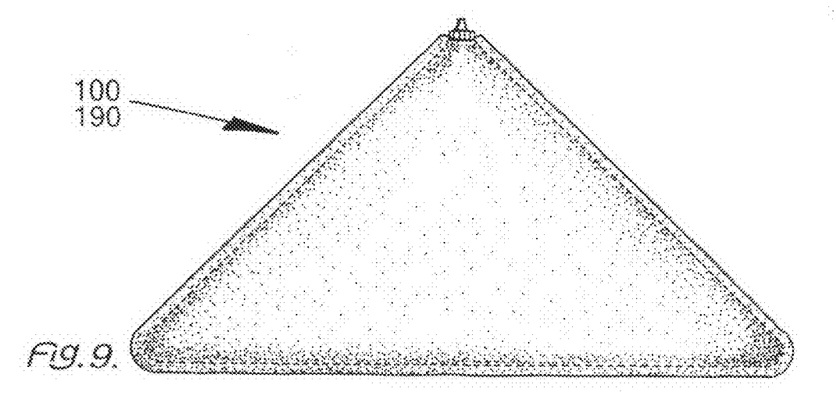
FIG. 9 depicts a top plan view for the durable pet bed 100 of this invention showing the corner triangular shape 190.

With FIG. 9, the durable pet bed 100 in the corner triangular shape 190 provides still another utilitarian function, with the desired comfort. Triangular shape 190 provides an efficient use of space, with the desired comfort. Other shapes are operable as indicated by FIG. 2.

Figure 11:
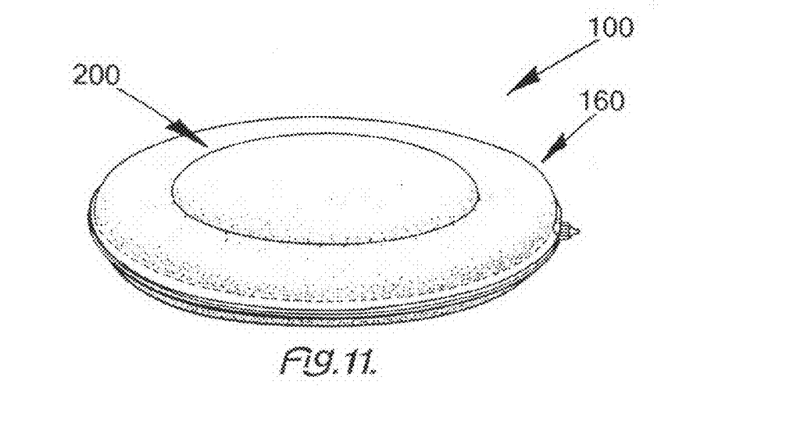
FIG. 11 depicts a perspective view for the durable pet bed 100 of this invention according to FIG. 6, showing a center pillow 200 for the doughnut shape 160.

With the addition of FIG. 10 and FIG. 11 to the consideration, pillow insert 200 may be used with doughnut shape 160. Pillow insert 200 has a structure similar to the structure of durable bed 100 described in FIG. 3, FIG. 4, and FIG. 5. Therefore, pillow insert 200 is similar in structure to durable bed 100, but small enough to fit within the diameter of inner aperture 162.

This application; taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A durable pet bed containing a fluid for comfort comprising:
    a fluid chamber being positioned within the durable pet bed;
    at least two layers of a bullet resistant fabric protecting the fluid chamber;
    a fluid receiving valve communicating with the fluid chamber in order to permit a fluid to pass therethrough;
    a cover concealing the at least two layers of a bullet resistant fabric protecting the fluid chamber;
    the fluid chamber being adaptable to receive a gas, a gel, or a liquid in order to provide comfort and safety for a pet using the durable pet bed;
    the cover including a decoration or a padding in order to conceal the bullet resistant material, and provide a desirable and functional appearance;
    the bullet resistant material being a woven fabric;
    the fluid chamber being a fluid-containing, durable material;
    the at least two layers of bullet resistant material being a woven material;
    the fluid receiving valve communicating with the fluid chamber and extending through the at least two layers of bullet resistant material and the cover;
    the at least two layers of bullet resistant material being a nylon with a denier of 450 to 1800;
    the fluid chamber being adaptable to receive a gas, a gel, or liquid to provide comfort and safety for a pet using the durable pet bed;
    the cover being a fleece fabric;
    the fluid receiving valve being a liquid or a gel receiving valve;
    the fleece cover being secured by gluing, sealing or stitching; and
    the fluid being a self sealing fluid in order to reduce or stop a leak from the fluid chamber.

2. The durable pet bed of claim 1 further comprising the at least two layers of bullet resistant material being a nylon with a denier of 1500 to 1750.

3. The durable pet. bed of claim 2 further comprising the at least two layers of bullet resistant material being a nylon with a denier of 1650 to 1725.

4. The durable pet bed of claim 1 further comprising:
    a) the fluid receiving valve being a liquid or a gel receiving valve;
    b) the fleece cover being secured by gluing, sealing or stitching;
    c) the fluid chamber having a self sealing material in order to reduce or stop a leak from the fluid chamber; and
    d) fluid chamber being hermetically sealed or welded.

5. The durable pet bed of claim 1 further comprising:
    a) the fluid receiving valve being a liquid or a gel receiving valve;
    b) the fleece cover being secured by gluing, sealing or stitching;
    c) the fluid being a self sealing fluid in order to reduce or stop a leak from the fluid chamber; and
    d) the fluid chamber having a self sealing material in order to reduce or stop a leak from the fluid chamber.

6. The durable pet bed of claim 5 further comprising the fluid receiving valve having a conversion valve removably secured thereto in order to fill the bed with a gas.

7. The durable pet bed of claim 1 further comprising:
    a) the at least two layers of bullet resistant material having at least one edge; and
    b) a strip of flashing skirt being inserted at the at least one edge in order to facilitate a stitching process or a welding process.

8. The durable pet bed of claim 7 further comprising:
    a) the durable pet bed having a doughnut shape with an inner aperture and an outer diameter;
    b) the inner aperture diameter being up to about 15 percent of the outer diameter; and
    c) the strip of flashing skirt being inserted at the inner aperture and or the outer diameter in order to facilitate the stitching or welding.

9. The durable pet bed of claim 8 further comprising the inner aperture diameter being about three to about 10 percent of the outer diameter.

10. The durable pet bed of claim 8 further comprising a pillow insert filling the inner aperture.

11. The durable pet bed of claim 1 further comprising the durable pet bed having a rectangular shape.

12. The durable pet bed of claim 1 further comprising the durable pet bed having a pillow shape secured to the cover directly or pocket.

13. The durable pet bed of claim 1 further comprising the durable pet bed having a triangular shape for use in a corner of a room.

14. A durable pet bed containing a fluid for comfort comprising:
    a) a fluid chamber being positioned within the durable pet bed;
    b) at least two layers of a bullet resistant fabric protecting the fluid chamber;
    c) a fluid receiving valve communicating with the fluid chamber in order to permit a fluid to pass therethrough;

d) a cover concealing the at least two layers of a bullet resistant fabric protecting the fluid chamber;
e) the fluid chamber being adaptable to receive a gas, a gel, or liquid in order to provide comfort and safety for a pet using the durable pet bed;
f) the cover including a decoration or a padding in order to conceal the bullet resistant material, and provide a desirable and functional appearance;
g) the bullet resistant material being a woven fabric;
h) the fluid chamber being a fluid-containing, durable material;
i) the at least two layers of bullet resistant material being a woven material;
j) the fluid receiving valve communicating with the fluid chamber and extending through the at least two layers of bullet resistant material and the cover;
k) the fluid chamber being adaptable to receive a gas, a gel, or liquid to provide comfort and safety for a pet using the durable pet bed;
l) the cover being a fleece fabric;
m) the fluid receiving valve being a liquid or a gel receiving valve;
n) the fleece cover being secured by gluing, sealing or stitching; and
o) the fluid being a self sealing fluid in order to reduce or stop a leak from the fluid chamber.

15. The durable pet bed of claim 14 further comprising
a) the fluid chamber having a self sealing material in order to reduce or stop a leak from the fluid chamber; and
b) fluid chamber being hermetically sealed or welded.

* * * * *